United States Patent
Zhu et al.

(10) Patent No.: US 10,306,523 B2
(45) Date of Patent: May 28, 2019

(54) METHODS, RADIO NETWORKS NODES AND A USER EQUIPMENT

(71) Applicant: Telefonaktiebolaget LM Ericsson (publ), Stockholm (SE)

(72) Inventors: Huaisong Zhu, Beijing (CN); Lei Xiao, Beijing (CN); Yang Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 196 days.

(21) Appl. No.: 15/039,939

(22) PCT Filed: Dec. 9, 2013

(86) PCT No.: PCT/CN2013/088872
§ 371 (c)(1),
(2) Date: May 27, 2016

(87) PCT Pub. No.: WO2015/085460
PCT Pub. Date: Jun. 18, 2015

(65) Prior Publication Data
US 2016/0381607 A1    Dec. 29, 2016

(51) Int. Cl.
*H04W 4/00* (2018.01)
*H04W 36/00* (2009.01)
(Continued)

(52) U.S. Cl.
CPC ... *H04W 36/0083* (2013.01); *H04W 36/0072* (2013.01); *H04W 36/10* (2013.01); *H04W 88/02* (2013.01); *H04W 88/08* (2013.01)

(58) Field of Classification Search
USPC ................. 370/329, 330, 331, 338
See application file for complete search history.

(56) References Cited

U.S. PATENT DOCUMENTS

| | | | |
|---|---|---|---|
| 2008/0113680 A1 | 5/2008 | Sung | |
| 2011/0149905 A1* | 6/2011 | Kim | H04W 36/02 370/331 |
| 2013/0070696 A1* | 3/2013 | Tang | H04W 52/146 370/329 |

FOREIGN PATENT DOCUMENTS

| | | |
|---|---|---|
| CN | 102123457 | 7/2011 |
| CN | 102170677 | 8/2011 |
| EP | 2 154 927 A1 | 2/2010 |

OTHER PUBLICATIONS

3GPP TS 36.331 v9.2.0; Technical Specification; 3rd Generation Partnership Project; Technical Specification Group Radio Access Network; Evolved Universal Terrestrial Radio Access (E-UTRA); Radio Resource Control (RRC); Protocol specification (Release 9)—Mar. 2010.

(Continued)

*Primary Examiner* — Zewdu A Beyen
(74) *Attorney, Agent, or Firm* — Baker Botts, LLP

(57) ABSTRACT

A method (400) in a radio network node (220) of a wireless communication system (200) for selecting a MSG3 size for a User Equipment (UE) (230) that is performing handover from a serving network node (210) to a neighbor network node (220) is disclosed. The method (400) comprises receiving (S402) 5 measurement information related to the UE (230) from the serving network node (210). The method (400) comprises selecting (S404) the MSG3 size based on the measurement information. The method (400) further comprises transmitting (S406) the MSG3 size to the UE (230), based on which UE related information is transmitted to the neighbor network node (220).

20 Claims, 5 Drawing Sheets

(51) Int. Cl.
  *H04W 36/10* (2009.01)
  *H04W 88/02* (2009.01)
  *H04W 88/08* (2009.01)

(56) References Cited

OTHER PUBLICATIONS

PCT International Search Report for international application No. PCT/CN2013/088872—dated Sep. 11, 2014.
PCT Written Opinion of the International Search Authority for International application No. PCT/CN2013/088872—dated Sep. 11, 2014.
3GPP TSG-RAN WG2 Meeting #82; Fukuoka, Japan; Source: Qualcomm Incorporated; Title: Signalling Reduction by RRC Message Combining (R2-132077)—May 20-24, 2013.
PCT Written Opinion ISA/237 for Application No. 13 89 9195—dated Jun. 6, 2017.
PCT Search Report ISA/210 for Application No. EP 13 89 9195—dated Jun. 6, 2017.
3GPP TSG RAN WG2 #59bis; Shanghai, China; Source: Panasonic, Fujitsu; Title: Message 3 generation and RRC interaction (R2-074143)—Oct. 8-12, 2007.
3GPP TSG RAN WG2 #56bis; Sorrento, Italy; Source: Panasonic; Title: NAS signalling transfer (R2-070093)—Jan. 15-19, 2007.
3GPP TSG-RAN WG2 Meeting #59bis; Shanghai, China; Source: Nokia Corporation, Nokia Siemens Networks; Title: Concatenation of NAS and RRC in Step 3 (R2-073906)—Oct. 8-12, 2007.

* cited by examiner

METHODS, RADIO NETWORKS NODES AND A USER EQUIPMENT

PRIORITY

This nonprovisional application is a U.S. National Stage Filing under 35 U.S.C. § 371 of International Patent Application Ser. No. PCT/CN2013/088872, filed Dec. 9, 2013, and entitled "Methods, Radio Network Nodes And A User Equipment."

TECHNICAL FIELD

Implementations described herein generally relate to methods, radio network nodes and a user equipment, more particularly related to the methods for selecting a MSG3 size for the user equipment that is performing handover from a serving network node to a neighbour network node, radio network nodes thereof, and a user equipment.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment, between a user equipment and a wire connected telephone and/or between a user equipment and a server via a Radio Access Network (RAN) and possibly one or more core networks.

The user equipment may further be referred to as mobile telephones, cellular telephones, computer tablets or laptops with wireless capability. The user equipments in the present text may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a radio network node, or base station e.g. a Radio Base Station (RBS), which in some networks may be referred to as "eNB", "eNodeB", "NodeB" or "B node", depending on the technology and terminology used. The radio network nodes may be of different classes such as e.g. macro eNodeB, home eNodeB or pico base station, based on transmission power and thereby also cell size. A cell is the geographical area where radio coverage is provided by the radio network node/base station at a base station site. One base station, situated on the base station site, may serve one or several cells. The radio network nodes communicate over the air interface operating on radio frequencies with the user equipment units within range of the respective radio network node.

In some radio access networks, several radio network nodes may be connected, e.g. by landlines or microwave, to a Radio Network Controller (RNC) e.g. in Universal Mobile Telecommunication System (UMTS). The RNC, also sometimes termed Base Station Controller (BSC) e.g. in GSM, may supervise and coordinate various activities of the plural radio network nodes connected thereto. GSM is an abbreviation for Global System for Mobile Communication.

UMTS is one of the third generation mobile communication technologies designed to succeed GSM. 3GPP Long Term Evolution (LTE) is a project within the 3rd Generation Partnership Project (3GPP) to improve the UMTS standard to cope with future requirements in terms of improved services such as high data rates, improved efficiency, and lowered costs. The Universal Terrestrial Radio Access Network (UTRAN) is the radio access network of an UMTS and Evolved UTRAN (E-UTRAN) is the radio access network of an LTE system.

Handover procedure in LTE, similar to other wireless communication system, is designed to guarantee the continuous coverage upon UE's movement. In an E-UTRAN, a UE 130 is wirelessly connected to a serving network node 110 and a neighbour network node 120, as illustrated in FIG. 1. Once UE 130 found a better cell served by the neighbour network node 120, it will send a measurement report to the serving network node 110. The serving network node 110 will then send a handover request to the neighbour network node 120 and if the neighbour network node 120 has enough resource to accept the handover, the neighbour network node 120 will send the handover acknowledgement to the serving network node 110. The serving network node 110 will send RRC Reconfiguration Request to UE 130 after forwarding the related data to the neighbour network node 120 and UE 130 will trigger the random access procedure to the neighbour network node 120.

In particular, UE 130 will send a random access preamble message to neighbour network node 120 (referred to as MSG1), neighbour network node 120 then sends the message indicating uplink grant to UE 130 (referred to as MSG2). UE 130 will send the UE related information and RRC Reconfiguration Complete message to the neighbour network node 120 based on the uplink grant in MSG2. That is, if the uplink grant is enough, UE 130 will send out both UE related information and RRC Reconfiguration Complete message through a single Message 3 (hereafter referred to as MSG3), and if the uplink grant is not enough, UE 130 will only send out the UE related information through the MSG3. In the later situation, RRC Reconfiguration Complete message will be sent on Message 5 (referred to as MSG5) to the neighbour network node 120 based on the uplink grant on Message 4 (referred to as MSG4) sent from the neighbour network node 120. Thus, there will be certain handover delay if the granted MSG3 size is not large enough to contain the RRC Reconfiguration Complete message.

On the other hand, the granted MSG3 size will also impact the cell coverage. The below table 1 and table 2 shows the two analysis with MSG3 sizes of 9 bytes (Table 1) and 19 bytes (Table 2) respectively.

TABLE 1

Maximum Pass Loss for MSG3 size 9 Bytes

|  | Msg 3 | PRACH f0 |
| --- | --- | --- |
| UE Output power | 0.20 W | 0.20 W |
| UE Output power | 23 dBm | 23 dBm |
| Thermal noise | −174 | −174 |
| Noise factor RBS | 3 | 3 |
| Payload size | 9 Byte | NA |
| Quality requirement |  | 1.0% |
| Bandwidth | 0.54 MHz | 1.08 MHz |
| Noise power | −113.7 | −110.7 |
| SINR used | −7.6 | −10.2 |
| RBS Sensitivity | −121.2 dBm | −120.9 dBm |
| Antenna gain | 18.5 | 18.5 |
| Feeder loss | 3 | 3 |
| Jumper loss | 0.5 | 0.5 |
| ASC insertion loss | 0 | 0 |
| Body loss | 0 | 0 |
| Penetration loss | 20 | 20 |

TABLE 1-continued

Maximum Pass Loss for MSG3 size 9 Bytes

|  | Msg 3 | PRACH f0 |
|---|---|---|
| Fading margin | 4.9 | 4.9 |
| Max pathloss unloaded | 134.3 dB | 134.0 dB |

TABLE 2

Maximum Pass Loss for MSG3 size 19 bytes

|  | Msg 3 | PRACH f0 |
|---|---|---|
| UE Output power | 0.20 W | 0.20 W |
| UE Output power | 23 dBm | 23 dBm |
| Thermal noise | −174 | −174 |
| Noise factor RBS | 3 | 3 |
| Payload size | 19 Byte | NA |
| Quality requirement |  | 1.0% |
| Bandwdth | 0.54 MHz | 1.08 MHz |
| Noise power | −113.7 | −110.7 |
| SINR used | −4.0 | −10.2 |
| RBS Sensistivity | −117.6 dBm | −120.9 dBm |
| Antenna gain | 18.5 | 18.5 |
| Feeder loss | 3 | 3 |
| Jumper loss | 0.5 | 0.5 |
| ASC insertion loss | 0 | 0 |
| Body loss | 0 | 0 |
| Penetration loss | 20 | 20 |
| Fading margin | 4.9 | 4.9 |
| Max pathloss unloaded | 130.7 dB | 134.0 dB |

It can be observed from the above analysis in tables 1 and 2, cell coverage (Maximum Pathloss) is −3.3 db less than PRACH0, which is the bottleneck of the cell coverage. That is, the large MSG3 size will reduce the cell coverage around 23% in some typical scenarios. Therefore, a problem addressed herein is how to keep the cell coverage while reducing the handover delay according to real situations.

In order to balance the coverage and the handover delay, in most cases the MSG3 size is configurable by the operators according to the real situation. For example, in rural area, small MSG3 size is configured for relatively large coverage of the cell, whereas in urban area, large MSG3 size is configured for improving the latency. The scenario of typical rural area is shown in FIG. 1(a), the scenario of typical urban area is shown in FIG. 1(b) and the inner ring areas A1 and A2 indicate the coverage with a large MSG3 size, the outer ring areas B1 and B2 indicate the coverage with a small MSG3 size. In rural area, as illustrated in FIG. 1(a), the handover area C is the overlap between the outer areas B1 and B2, and in urban area, as illustrated in FIG. 1(b), the handover area C is the overlap between the inner areas A1 and A2.

The configuring of the MSG3 size is based on the assumption that the cell is a regular shape according to the ideal cell planning, however due to some obstacles such as buildings, walls, etc., the cell cannot be the regular shape. Therefore, configuring the MSG3 size based on the cell areas as mentioned above does not work well in real situation.

SUMMARY

It is therefore an object to obviate at least some of the above mentioned disadvantages and to improve the performance in wireless communication system.

According to a first aspect, the object is achieved by a method in a radio network node of a wireless communication system, aiming at selecting a MSG3 size for a User Equipment (UE) that is performing handover from a serving network node to a neighbour network node. The method comprises receiving measurement information related to the UE from the serving network node. The method comprises selecting the MSG3 size based on the measurement information. The method further comprises transmitting the MSG3 size to the UE, based on which UE related information is transmitted to the neighbour network node.

According to a second aspect, the object is achieved by a method in a User Equipment (UE) of a wireless communication system, aiming at performing handover from a serving network node to a neighbor network node. The method comprises receiving a MSG3 size from neighbour network node, and the MSG3 size is selected by the neighbour network node based on measurement information related to the UE that is transmitted from the serving network node to the neighbour network node. The method further comprises transmitting UE related information to the neighbour network node based on the MSG3 size.

According to a third aspect, the object is achieved by a method in a radio network node of a wireless communication system, aiming at enabling the selection of a MSG3 size for a User Equipment (UE) that is performing handover from a serving network node to a neighbour network node. The method comprises receiving a measurement report for triggering handover from the UE. The method further comprises transmitting measurement information related to the UE to the neighbour network node, and the MSG3 size is selected by the neighbour network node based on the measurement information.

According to a fourth aspect, the object is achieved by a radio network node of a wireless communication system. The radio network node is configured to select a MSG3 size for a User Equipment (UE) that is performing handover from a serving network node to neighbour network node. The radio network node comprises a receiver configured to receive measurement information related to the UE from the serving network node. The radio network node comprises a processing circuit configured to select the MSG3 size based on the measurement information. The radio network nodes further comprises a transmitter configured to transmit the MSG3 size to the UE, based on which UE related information is transmitted to the neighbour network node.

According to a fifth aspect, the object is achieved by a User Equipment (UE) of a wireless communication system. The UE is configured to perform handover from a serving network node to a neighbor network node. The UE comprises a receiver configured to receive a MSG3 size from neighbour network node, and the MSG3 size is selected by the neighbour network node based on the measurement information related to the UE that is transmitted from the serving network node to the neighbour network node. The UE further comprises a transmitter configured to transmit UE related information to the neighbour network node based on the MSG3 size.

According to a sixth aspect, the object is achieved by a radio network node of a wireless communication system. The radio network node is configured to enable the selection of a MSG3 size for a User Equipment (UE) that is performing handover from a serving network node to a neighbour network node. The radio network node comprises a receiver configured to receive a measurement report for triggering handover from the UE. The radio network node further comprises a transmitter configured to transmit measurement information related to the UE to neighbour network node, and the MSG3 size is selected by the neighbour network node based on the measurement information.

By adopting present disclosure, the MSG3 size will be selected for each UE that is performing handover, and a balance between latency and coverage can be achieved for each UE. That is, if it is determined that the MSG3 receiving signal quality is good enough, the present disclosure can reduce the latency of handover of the UE. On the other hand, if it is determined that the MSG3 receiving signal quality is not good enough, the present disclosure could secure the coverage for the UE.

DRAWINGS

FIG. 1(a) and FIG. 1(b) are schematic diagrams illustrating handover areas of different scenarios according to prior art;

DETAILED DESCRIPTION

In the following, different aspects will be described in more detail with references to certain embodiments and to accompanying drawings. For purpose of explanation and not limitation, specific details are set forth, such as particular scenarios and techniques, in order to provide a thorough understanding of the different embodiments. However, other embodiments that depart from these specific details may also exist.

Moreover, those skills in the art will appreciate that while the embodiments are primarily described in form of methods and nodes, they may also be embodied in computer program product as well as in a system including a computer processor and a memory coupled to the processor, wherein the memory is encoded with one or more programs that may perform the method steps disclosed herein.

Figure 1A:
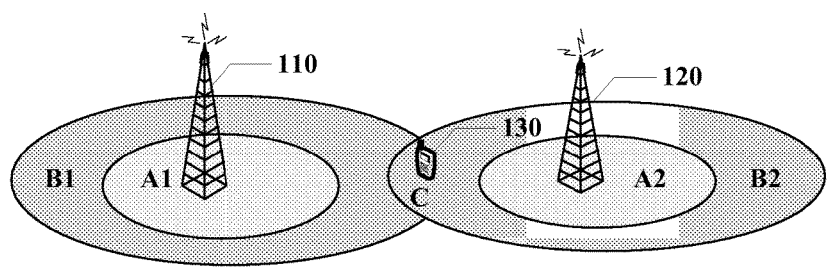
Figure 1B:
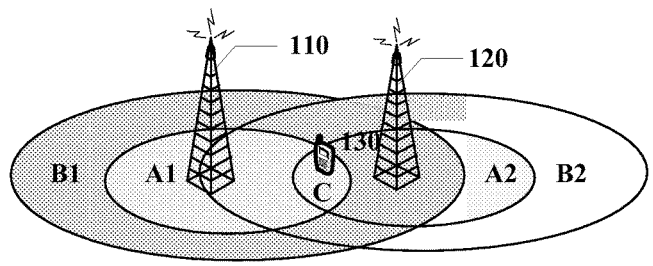
Figure 2:
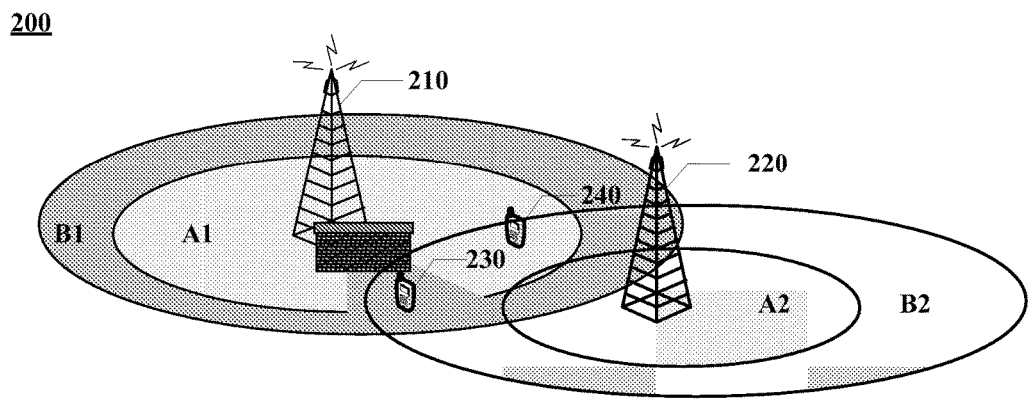
FIG. 2 is a schematic overview illustrating the actual wireless communication system where the embodiments of present disclosure may be practiced.

FIG. 2 is schematic overview illustrating the actual wireless communication system where the embodiments of present disclosure may be practiced. The illustrated wireless communication system 200 comprises User Equipment (UE) 230 or 240, and a serving network node 210 which is serving a serving cell, wherein the UE 230 or 240 is situated, at least for the moment. The wireless communication system 200 further comprises a neighbour network node 220, which is serving the neighbour cell. UE 230 or 240 are situated in a handover area between the serving cell and the neighbour cell, in which area a handover may be performed under some circumstances.

According to the prior art, UEs 230 and 240 should use the same MSG3 size during the handover, since the MSG3 size configured by the operators or hardcoded is cell specific and the UEs handover to the same cell should use the same MSG3 size. However, due to the obstacles in many circumstances (for example, buildings and walls), cell coverage is not always a regular shape. As illustrated in FIG. 2, UE 230 is closed to the wall and thus it cannot support large MSG3 size whereas UE 240 can support large MSG3 size during the handover. According to the present disclosure, the serving network node 210 is configured to transmit measurement information related to UEs 230 and 240 respectively to the neighbour network node 220 to facilitate the selection of the MSG3 size for the UEs, so that UEs 230 and 240 could be informed for the respective MSG3 size. By doing so, the cell coverage and the handover latency could be well balanced.

The purpose of the illustration in FIG. 2 is to provide a simplified, general overview of the methods, radio network nodes and UEs herein described, and the functionalities involved. The methods, radio network nodes and UEs will subsequently, as a non-limiting example, be described in a 3GPP/LTE environment, but the embodiments of the disclosed methods, radio network nodes and UEs may operate in a wireless communication system 200 based on another access technology such as e.g. any of the above enumerated. Thus, although the following embodiments are described based on 3GPP LTE systems, it is by no means limited to 3GPP LTE.

It is to be noted that the illustrated network setting of network nodes 210, 220 and/or UEs 230, 240 in FIG. 2 is to be regarded as a non-limiting embodiment only. The wireless communication system 200 may comprise any other number and/or combination of network nodes 210, 220 and UEs 230, 240, although only two instances of network nodes 210, 220 and two instances of UEs 230, 240, respectively, are illustrated in FIG. 2 for clarity reasons. A plurality of network nodes 210, 220 and UEs 230, 240 may further be involved in present methods according to some embodiments.

Thus whenever "one" or "a/an" network node 210, 220 and/or UEs 230, 240 is referred to in the present context, a plurality of network nodes 210, 220 and UEs 230, 240 may be involved, according to some embodiments.

The serving network node 210 and the neighbour network node 220 may according to some embodiments be referred to as e.g. base stations, NodeBs, evolved NodeBs (eNBs, or eNodeBs), base transceiver stations, Access Point Base Stations, base station routers, Radio Base Stations (RBSs), macro base stations, micro base stations, pico base stations, femto base stations, Home eNodeBs, sensors, beacon devices, relay nodes, repeaters or any other network nodes configured for communication with the UE 230 or 240 over a wireless interface, depending e.g. of the radio access technology and terminology used.

The UE 230 or 240 may be represented by e.g. a wireless communication terminal, a mobile cellular phone, a Personal Digital Assistant (PDA), a wireless platform, a mobile station, a portable communication device, a laptop, a computer, a wireless terminal acting as a rely, a relay node, a mobile relay, a Customer Premises Equipment (CPE), a Fixed Wireless Access (FWA) nodes or any other kind of device configured to communicate wirelessly with the serving network node 210 and/or neighbour network node 220.

In the following, only UE 230 will be used as an example for describing in detail the present disclosure.

Figure 3:
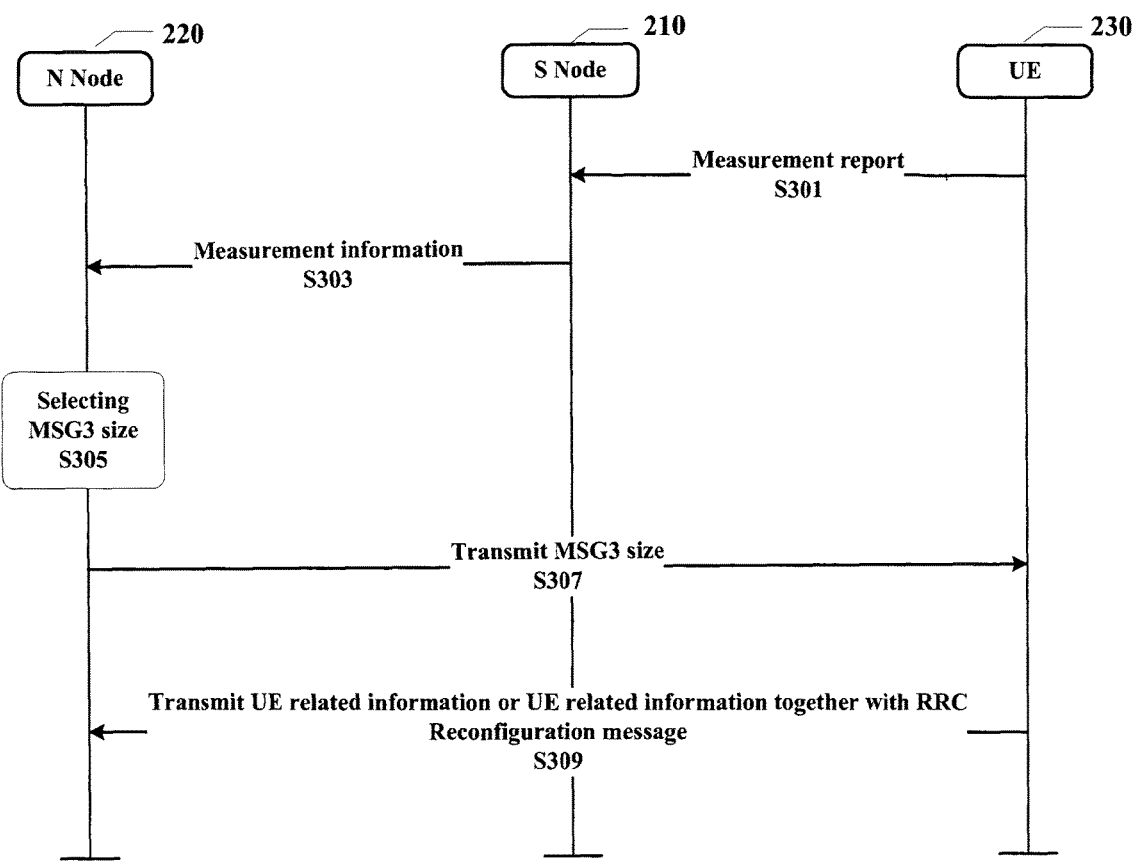
FIG. 3 is a schematic messaging diagram illustrating the handover procedure according to some embodiments of present disclosure.

FIG. 3 is a schematic messaging diagram 300 illustrating the handover procedure according to some embodiments of present disclosure. As illustrated in FIG. 3, UE 230 transmits a measurement report for triggering handover at step S301. The serving network node 210 transmits measurement information related to the UE 230 to the neighbour network node 220 at step S303. In some embodiments, the measurement information comprises at least one of Reference Signal Receive Power (RSRP) of the serving network node 210, path loss of the neighbor network node 220, maximum transmission power of UE 210, Message 3 (MSG3) receiving power of the neighbor network node 220, sounding related information of UE 230, and Physical Uplink Shared Channel (PUSCH) scheduling and demodulation information. In some embodiments, the measurement information could be sent by private signaling or by handover request defined in X2 message.

The neighbour network node 220 then determines MSG3 size based on the measurement information at step S305 and transmits the determined MSG3 size to UE 230 at step 307, so that UE 230 transmits UE related information or UE related information together with RRC Reconfiguration Complete message to neighbour network node 220 based on the MSG3 size, at step 309. The MSG3 size refers to the size of the MSG3 granted by the neighbour network node 220 during the handover procedure, and can be varied from 16 bit (2 byte) to max 75376 bit. In the following, terms large MSG3 size and small MSG size are used to specify two different MSG3 sizes. Large MSG3 size indicates the minimum of possible large MSG3 sizes which is enough to carry signaling message, and small MSG3 size indicates the maximum of possible small MSG3 size which do not limit the coverage of the cell. In some embodiments, the UE related information comprises Cell Radio Network Temporary Identify (C-RNTI), Buffer Status Report (BSR) and Power Headroom (PHR). In some embodiments, UE 230 only transmits the UE related information to the neighbour network node 220 if a small MSG3 size is received, and UE 230 transmits the UE related information and RRC (Radio Resource Control) Reconfiguration message together to neighbour network node 230 if a large MSG3 size is received.

Figure 4:
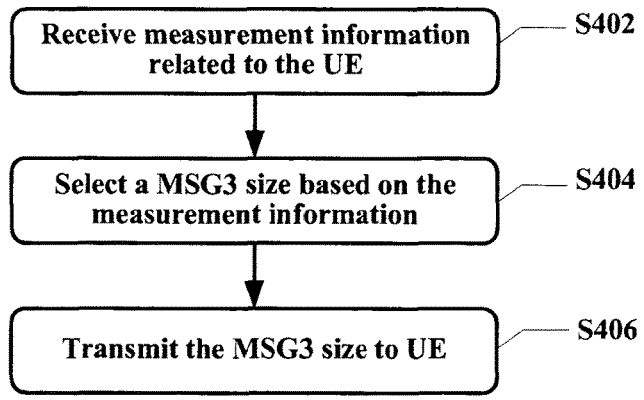
FIG. 4 is a flowchart illustrating a method in a radio network node according to some embodiments of present disclosure.

FIG. 4 is a flowchart illustrating a method 400 in a radio network node, i.e. neighbour network node 220 according to some embodiments of present disclosure. As illustrated in FIG. 4, the neighbour network node 220 receives measurement information related to the UE 230 transmitted from the serving network node 210, at step S402. In some embodiments, the measurement information comprises at least one of Reference Signal Receive Power (RSRP) of the serving network node 210, path loss of the neighbor network node 220, maximum transmission power of UE 230, MSG3 receiving power of the neighbor network node 220, sounding related information of UE 230, and Physical Uplink Shared Channel (PUSCH) scheduling and demodulation information.

The neighbour network node 220 further selects the MSG3 size based on the measurement information related to the UE 230, at step S404. Further, the neighbour network node 220 transmits the selected MSG3 size to UE 230 at step S406. The step S404 will be described in more detail hereafter.

In some embodiments, the neighbour network node 220 estimates MSG3 receiving signal quality of the neighbour network node 220 based on the measurement information and compares the MSG3 receiving signal quality of the neighbour network node 220 to a predetermined threshold. In some embodiments, the MSG3 receiving signal quality is indicated by a range of Signal to Interference plus Noise Ratio (SINR) or a value of SINR.

In some embodiments, the MSG3 receiving signal quality is directly estimated from the measurement information, which comprises at least one of Reference Signal Receive Power (RSRP) of the serving network node 210, path loss of the neighbor network node 220 and maximum transmission power of UE 230, that retrieved from the measurement information. In such a case, the MSG3 receiving signal quality is indicated by the range with a smallest MSG3 receiving quality and a largest MSG3 receiving quality. In such a case, the neighbour network node 220 performs at least one of the following steps: comparing the smallest MSG3 receiving quality with the predetermined threshold, and selecting the large MSG3 size if the smallest MSG3 receiving quality is larger than the predetermined threshold; and comparing the largest MSG3 receiving quality with the predetermined threshold, and selecting the small MSG3 size if the largest MSG3 receiving quality is smaller than the predetermined threshold.

In some embodiments, the neighbour network node 220 further receives sounding related information of the UE 230 and/or PUSCH scheduling and demodulation information from the serving network node 210, if the smallest MSG3 receiving signal quality is smaller than the predetermined threshold and the largest MSG3 receiving quality is larger than the predetermined threshold, to further enhancing the performance together with the embodiments described hereafter.

In some other embodiments, the measurement information comprises sounding related information of the UE 230 and/or PUSCH scheduling and demodulation information. In such a case, the neighbour network node 220 estimates the MSG3 receiving signal quality of the neighbour network node 220 by monitoring uplink sounding of the UE based on the sounding related information, and/or by monitoring PUSCH based on the PUSCH scheduling and demodulation information. In some embodiments, the sounding related information comprises sounding resource configuration information, and the PUSCH scheduling and demodulation information comprises PUSCH resource configuration information and Demodulation Reference Signal (DMRS). Then, the neighbour network node 220 selects the large MSG3 size if the MSG3 receiving signal quality is larger than the predetermined threshold, and selects the small MSG3 size if the MSG3 receiving quality is smaller than the predetermined threshold.

Figure 5:
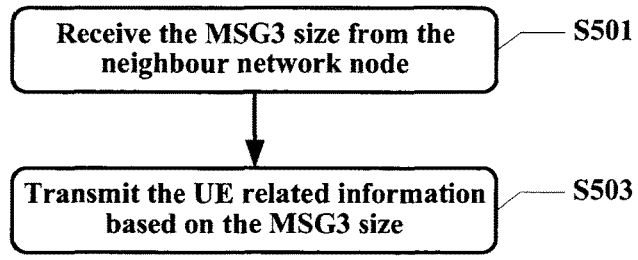
FIG. 5 is a flowchart illustrating a method in a UE according to some embodiments of present disclosure.

FIG. 5 is a flowchart illustrating a method 500 in a UE according to some embodiments of present disclosure. As illustrated in FIG. 5, UE 230 receives from the neighbour network node 220 the MSG3 size selected based on measurement information related to UE 230 by the neighbour network node 220, at step S501. Then, UE 230 transmits the UE related information or the UE related information together with RRC Reconfiguration Complete message to the neighbour network node 220 based on the MSG3 size, at step S503. In some embodiments, the UE related information comprises Cell Radio Network Temporary Identify (C-RNTI), Buffer Status Report (BSR) and Power Headroom (PHR). In some embodiments, UE 230 only transmits the UE related information to the neighbour network node 220 if the small MSG3 size is received, and UE 230 transmits the UE related information and RRC Reconfiguration message together to neighbour network node 230 if the large MSG3 size is received.

Figure 6:
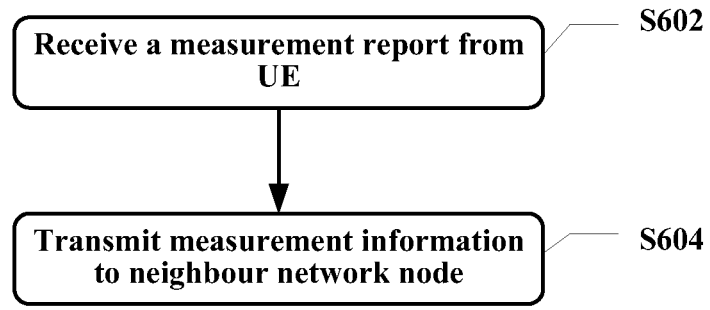
FIG. 6 is a flowchart illustrating a method in a radio network node according to some embodiments of present disclosure.

FIG. 6 is a flowchart illustrating a method 600 in a radio network node, i.e. serving network node 210 according to some embodiments of present disclosure. As illustrated in FIG. 6, the serving network node 210 receives a measurement report for triggering handover from UE 230, at step 602. Further, the serving network node 210 transmits measurement information related to UE 230 to the neighbour network node 220 at step 604, and the measurement information is used for selecting the MSG3 size by the neighbour network node 220. In some embodiments, the measurement information comprises at least one of Reference Signal Receive Power (RSRP) of the serving network node 210, path loss of the neighbor network node 220, maximum transmission power of UE 210, Message 3 (MSG3) receiving power of the neighbor network node 220, sounding related information of UE 230, and Physical Uplink Shared Channel (PUSCH) scheduling and demodulation information.

Figure 7:
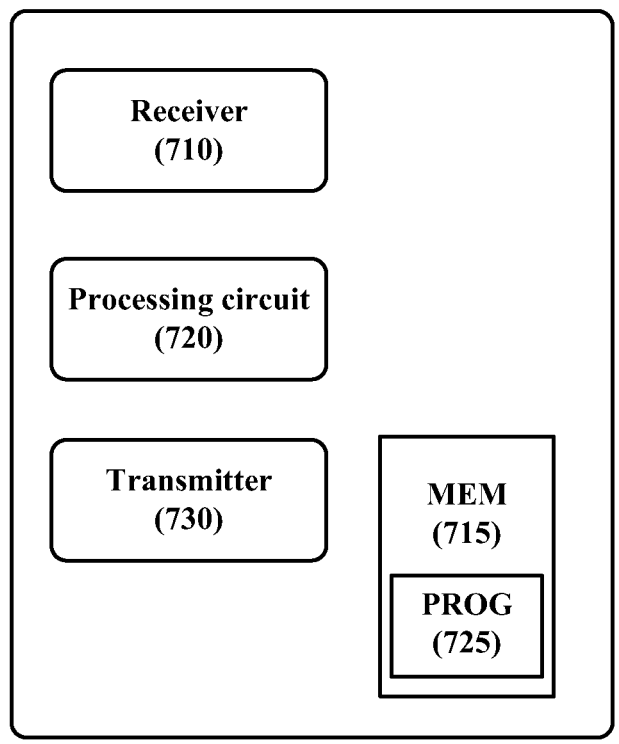
FIG. 7 is a schematic diagram illustrating a radio network node according to some embodiments of present disclosure.

FIG. 7 is a schematic diagram illustrating a radio network node, i.e. neighbour network node 220 configured to perform the above described steps S402 to S406, according to some embodiments of present disclosure.

The UE 230 is performing a handover from a serving network node 210 to the neighbour network node 230 in a wireless communication system 200. The wireless communication system 200 may be based on third Generation Partnership Project (3GPP) Long Term Evolution (LTE), according to some embodiments. The serving network node 210 and the neighbour network node 220 are radio network nodes comprising e.g. an eNodeB in some embodiments, configured for wireless communication with the UE 230.

For the sake of clarity, any internal electronics or other components of the neighbour network node 220, not completely indispensable for understanding the implementation of the above described steps S402 to S406 comprised in the method has been omitted from FIG. 7.

In order to perform steps S402 to S406 correctly, the neighbour network node 220 comprises a receiver 710, configured to receive measurement information related to the UE 230 from the serving network node 210. In some embodiments, the measurement information comprises at least one of Reference Signal Receive Power (RSRP) of the serving network node 210, path loss of the neighbor network node 220, maximum transmission power of UE 230, MSG3 receiving power of the neighbor network node 220, sounding related information of UE 230, and Physical Uplink Shared Channel (PUSCH) scheduling and demodulation information.

The neighbour network node 220 further comprises a processing circuit 720 configured to select the MSG3 size based on the measurement information related to the UE 230. In some embodiments, the processing circuit 720 is configured to estimate MSG3 receiving signal quality of the neighbour network node 220 based on the measurement information and compare the MSG3 receiving signal quality of the neighbour network node 220 to a predetermined threshold. In some embodiments, the MSG3 receiving signal quality is indicated by a range of Signal to Interference plus Noise Ratio (SINR) or a value of SINR.

In some embodiments, the MSG3 receiving signal quality is directly estimated from the measurement information, which comprises at least one of Reference Signal Receive Power (RSRP) of the serving network node 210, path loss of the neighbor network node 220 and maximum transmission power of UE 230, that retrieved from the measurement information. In such a case, the MSG3 receiving signal quality is indicated by the range with a smallest MSG3 receiving quality and a largest MSG3 receiving quality. In such a case, the processing circuit 720 is configured to perform at least one of the following steps: comparing the smallest MSG3 receiving quality with the predetermined threshold, and selecting the large MSG3 size if the smallest MSG3 receiving quality is larger than the predetermined threshold; and comparing the largest MSG3 receiving quality with the predetermined threshold, and selecting the small MSG3 size if the largest MSG3 receiving quality is smaller than the predetermined threshold.

In some embodiments, the processing circuit 720 is further configured to receive sounding related information of the UE 230 and/or PUSCH scheduling and demodulation information from the serving network node 210, if the smallest MSG3 receiving signal quality is smaller than the predetermined threshold and the largest MSG3 receiving quality is larger than the predetermined threshold, to further enhancing the performance together with the embodiments described hereafter.

In some other embodiments, the measurement information comprises sounding related information of the UE 230 and/or PUSCH scheduling and demodulation information. In such a case, the processing circuit 720 is configured to estimate the MSG3 receiving signal quality of the neighbour network node 220 by monitoring uplink sounding of the UE based on the sounding related information, and/or by monitoring PUSCH based on the PUSCH scheduling and demodulation information. In some embodiments, the sounding related information comprises sounding resource configuration information, and the PUSCH scheduling and demodulation information comprises PUSCH resource configuration information and Demodulation Reference Signal (DMRS). Then, the processing circuit 720 is configured to select the large MSG3 size if the MSG3 receiving signal quality is larger than the predetermined threshold, and select the small MSG3 size if the MSG3 receiving quality is smaller than the predetermined threshold.

The processing circuit 720 may comprise e.g. one or more instances of a Central Processing Unit (CPU), a processing unit, a processor, a microprocessor, means for processing data, or other processing logic that may interpret and execute instructions. The processing circuit 720 may further perform data processing functions for inputting, outputting, and processing of data comprising data buffering and device control functions, such as call processing control, user interface control, or the like.

The neighbour network node 220 further comprises a transmitter 730 configured to transmit the selected MSG3 size to UE 230, based on which UE 230 transmits UE related information or UE related information together with RRC Reconfiguration Complete message to the neighbour network node 220. In some embodiments, the neighbour network node 220 may comprise at least one memory 715. The memory 715 may comprise a physical device utilized to store data or programs 725 i.e. sequences of instructions, on a temporary or permanent basis. In some embodiments, the memory may comprise integrated circuits comprising silicon based transistors. Further, the memory 715 may be volatile, non-volatile or comprise some units which are volatile and some units which are non-volatile, according to different embodiments.

Figure 8:
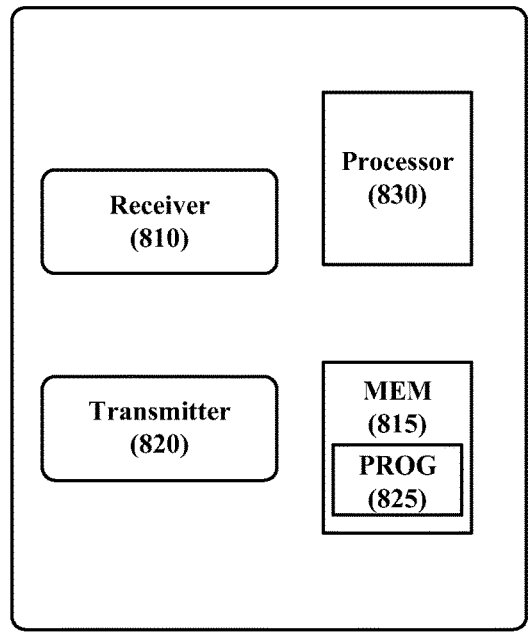
FIG. 8 is a schematic diagram illustrating a UE according to some embodiments of present disclosure.

FIG. 8 is a schematic diagram illustrating a UE, i.e. UE 230 according to some embodiments of present disclosure. In order to perform the steps S501 to S503 correctly, UE 230 comprises a receiver 810 configured to receive a MSG3 size from the neighbour network node 220, and the MSG3 size is selected based on measurement information related to UE 230 received from serving network node 210, by the neighbour network node 220. UE 230 further comprises a transmitter 820 configured to transmits UE related information or UE information together with RRC Reconfiguration Complete message to the neighbour network node 220 based on the MSG3 size. In some embodiments, the UE related information comprises Cell Radio Network Temporary Identify (C-RNTI), Buffer Status Report (BSR) and Power Headroom (PHR). In some embodiments, transmitter 820 is configured to transmit the UE related information to the neighbour network node 220 if a small MSG3 size is received, and alternatively the transmitter 820 is configured to transmit the UE related information together with RRC Reconfiguration message to neighbour network node 230 if a large MSG3 size is received.

In some embodiments, UE 230 further comprises a processing circuit 830 and/or momory 815. The processing circuit 830 may comprise e.g. one or more instances of a Central Processing Unit (CPU), a processing unit, a processor, a microprocessor, means for processing data, or other processing logic that may interpret and execute instructions. The processing circuit 720 may further perform data processing functions for inputting, outputting, and processing of data comprising data buffering and device control functions, such as call processing control, user interface control, or the like. The memory 815 may comprise a physical device utilized to store data or programs 825 i.e. sequences of instructions, on a temporary or permanent basis. In some embodiments, the memory may comprise integrated circuits comprising silicon based transistors. Further, the memory 815 may be volatile, non-volatile or comprise some units which are volatile and some units which are non-volatile, according to different embodiments.

Figure 9:
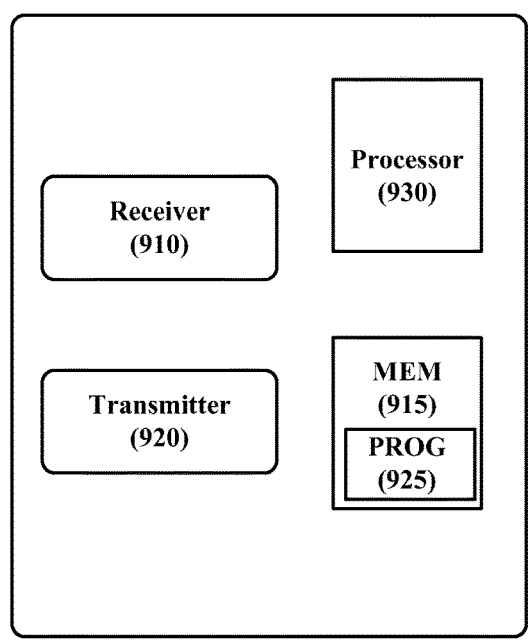
FIG. 9 is a schematic diagram illustrating a radio network node according to some embodiments of present disclosure.

FIG. 9 is a schematic diagram illustrating a radio network node, i.e. serving network node 210 according to some embodiments of present disclosure. In order to perform the steps S602 to S604 correctly, the serving network node 210 comprise a receiver 910 configured to receive a measurement report for triggering handover from UE 230. The serving network node 210 further comprises a transmitter 920 configured to transmit measurement information related to UE 230 to the neighbour network node 220, and the measurement information is used for selecting the MSG3 size by the neighbour network node 220. In some embodiments, the measurement information comprises at least one of Reference Signal Receive Power (RSRP) of the serving network node 210, path loss of the neighbor network node 220, maximum transmission power of UE 210, Message 3 (MSG3) receiving power of the neighbor network node 220, sounding related information of UE 230, and Physical Uplink Shared Channel (PUSCH) scheduling and demodulation information.

In some embodiments, the serving network node 210 further comprises a processing circuit 930 and or memory 915. The processing circuit 720 may comprise e.g. one or more instances of a Central Processing Unit (CPU), a processing unit, a processor, a microprocessor, means for processing data, or other processing logic that may interpret and execute instructions. The processing circuit 720 may further perform data processing functions for inputting, outputting, and processing of data comprising data buffering and device control functions, such as call processing control, user interface control, or the like. The memory 915 may comprise a physical device utilized to store data or programs 925 i.e. sequences of instructions, on a temporary or permanent basis. In some embodiments, the memory may comprise integrated circuits comprising silicon based transistors. Further, the memory 915 may be volatile, non-volatile or comprise some units which are volatile and some units which are non-volatile, according to different embodiments.

Further, it is to be noted that some of the described units 710-730 comprised within the neighbour network node 220, 810-830 comprised within UE 230 and/or 910-930 comprised within the serving network node 220 in the wireless communication system 200 are to be regarded as separate logical entities but not with necessity separate physical entities. To mention just one example, the receiver 710, 810 and/or 910, and the transmitter 730, 820 and/or 920 may be comprised or co-arranged within same physical unit, a transceiver, which may comprise a transmitter circuit and a receiver circuit, which transmits outgoing radio frequency signals and receives incoming radio frequency signals, respectively, via an antenna.

In some embodiments, the steps S402 to S406 to be performed in the neighbour network node 220, the steps S501 to S503 to be performed in UE 230, and/or the steps S602 to S604 to be performed in the serving network node may be implemented by computer program code for performing functions of the described steps S402 to S406, steps S501 to S503 and/or steps S602 to S604, respectively. Thus a computer program product, comprising instructions for performing the steps S402 to S406 in the neighbour network node, performing the steps S501 to S503 in UE 230, and/or performing the steps S602 to S604 may be provided for instance in the form of data carrier carrying computer program code for performing at least some of the steps mentioned above according to some embodiments. The data carrier may be e.g. a hard disk, a CD-ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the neighbour network node 220, UE 230 or serving network node 210 remotely, e.g. over an Internet or an intranet connection.

The terminology used in the detailed description of particular exemplary embodiments illustrated in the accompanying drawings is not intended to be limiting of the described methods 400-600, serving network node 210, neighbour network node 220 and/or UE 230, which instead are limited by the enclosed claims.

As used herein, the term "and/or" comprises any and all combinations of one or more of the associated listed items. Further, if used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "ideast," may be used to specify a particular item from a more general recitation. The common abbreviation "etc.", which derives from the Latin expression "et cetera" meaning "and other things" or "and so on", may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes", "comprises", "including" and/or "comprising", when used in this specification, specify the presence of stated features, steps, integers, actions, operations, elements, and/or components, but do not preclude the presence or addition of one or more other features, steps, integers, actions, elements, components and/or groups thereof.

Unless otherwise defined, all terms comprising technical and scientific terms used herein have the same meaning as commonly understood by one of ordinary skilled in the art to which the described embodiments belongs. It would be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method in a radio network node of a wireless communication system for selecting a MSG3 size for a User Equipment (UE) that is performing handover from a serving network node to the radio network node, wherein the radio network node is a neighbor network node to the serving node, the method comprising:
    receiving, from the serving network node, measurement information related to the UE;
    selecting, based on the measurement information, the MSG3 size; and
    transmitting the MSG3 size to the UE, wherein whether an RRC reconfiguration message is included with UE related information in a MSG3 from the UE is received at the neighbor network node is based on the MSG3 size.

2. The method according to claim 1, further comprising:
    estimating MSG3 receiving signal quality of the neighbor network node based on the measurement information; and
    comparing the MSG3 receiving signal quality of the neighbor network node to a predetermined threshold.

3. The method according to claim 2, wherein the MSG3 receiving signal quality of the neighbor network node is Signal to Interference plus Noise Ratio (SINR).

4. The method according to claim 1, wherein the measurement information comprises at least one of Reference Signal Receive Power (RSRP) of the serving network node, path loss of the neighbor network node, maximum transmission power of UE, MSG3 receiving power of the neighbor network node, a sounding related information of the UE and a Physical Uplink Shared Channel (PUSCH) scheduling and demodulation information.

5. The method according to claim 4, wherein the sounding related information comprises sounding resource configuration information.

6. The method according to claim 4, wherein the PUSCH scheduling and demodulation information comprises PUSCH resource configuration information and Demodulation Reference Signal (DMRS).

7. The method according to claim 1, further comprising one of the following steps;
    estimating a smallest MSG3 receiving signal quality of the neighbor network node based on the measurement information and selecting a large MSG3 size if the smallest MSG3 receiving signal quality is larger titan the predetermined threshold; and
    estimating a largest MSG3 receiving signal quality of the neighbor network node based on the measurement information and selecting a small MSG3 size if the largest MSG3 receiving signal quality is smaller than the predetermined threshold.

8. The method according to claim 1, timber comprising;
    receiving, from serving network node, the sounding related information of the UE and/or the PUSCH scheduling and demodulation information, if the smallest MSG receiving signal quality is smaller than the predetermined threshold and the largest MSG3 receiving signal quality is larger than the predetermined threshold.

9. The method according to claim 1, wherein the measurement information comprises the sounding related information of the UE, and the method further comprising:
    estimating the MSG3 receiving signal quality of the neighbor network node by monitoring uplink sounding of the UE based on the sounding related information of the UE,
    selecting a large MSG3 size if the MSG3 receiving signal quality of the neighbor network node is larger than the predetermined threshold; and
    selecting a small MSG3 size if the MSG3 receiving signal quality of the neighbor network node is smaller than the predetermined threshold.

10. The method according to claim 9, further comprises;
    selecting the small MSG3 size if the uplink sounding of the cannot be monitored.

11. The method according to claim 1, wherein the measurement information comprises PUSCH scheduling and demodulation information, and the method further comprising:
    estimating the MSG3 receiving signal quality of the neighbor network node by monitoring PUSCH based on the PUSCH scheduling and demodulation information;
    selecting a large MSG3 size if the MSG3 receiving signal quality of the neighbor network node is larger than the predetermined threshold; and
    selecting a small MSG3 size if the MSG3 receiving signal quality of the neighbor network node is smaller than the predetermined threshold.

12. The method according to claim 1, Wherein the UE related information comprises at least one of cell Radio Network Temporary Identify (C-RNTI), Buffer Status Report (BSR) and Power Headroom (PHR).

13. A radio network node of a wireless communication system for selecting a MSG3 size for a User Equipment (UE) that is performing handover from a serving network node to the radio network node, wherein the radio network node is a neighbour network node to the serving node, comprising;
    a receiver configured to receive from the serving network node, measurement information related to the UE;
    a processing circuit configured to select, based on the measurement information, the MSG3 size; and
    a transmitter configured to transmit the MSG3 size to the UE, wherein whether an RRC reconfiguration message is included with UE related information in a MSG3 from the UE is received at the neighbor network node is based on the MSG3 size.

14. The radio network node according to claim 13, wherein the processing circuit further performs the following steps:
    estimating MSG3 receiving signal quality of the neighbor network node based on the measurement information; and
    comparing the MSG3 receiving signal quality of the neighbor network node to a predetermined threshold.

15. The radio network node according to claim 13, wherein the measurement information comprises at least one of Reference Signal Receive Power (RSRP) of the serving network node, path loss of the neighbor network node, maximum transmission power of UE, MSG3 receiving power of the neighbor network node, a sounding related information of the UE and a Physical Uplink Shared Channel (PUSCH) scheduling and demodulation information.

16. The radio network node according to claim 15, wherein the sounding related information comprises sounding resource configuration information.

17. The radio network node according to claim 13, wherein the processing circuit further performs the following steps:
estimating a smallest MSG3 receiving signal quality of the neighbor network node based on the measurement information and selecting a large MSG3 size if the smallest MSG3 receiving signal quality is larger than the predetermined threshold; and
estimating a largest MSG3 receiving signal quality of the neighbor network node based on the measurement information and selecting a small MSG3 size if the largest MSG3 receiving signal quality is smaller than the predetermined threshold.

18. The radio network node according to claim 13, wherein the receiver further performs the following step:
receiving, from serving network node, the sounding related information of the UE and/or the PUSCH scheduling and demodulation information, if the smallest MSG receiving signal quality is smaller than the predetermined threshold and the largest MSG3 receiving signal quality is larger than the predetermined threshold.

19. The radio network node according to claim 13, wherein the measurement information comprises the sounding related information of the UE, and the processing circuit further performs the following steps:
estimating the MSG3 receiving signal quality of the neighbor network node by monitoring uplink sounding of the UP based on the sounding related information of the UE;
selecting a large MSG3 size if the MSG3 receiving signal quality of the neighbor network node is larger than the predetermined threshold; and
selecting a small MSG3 size if the MSG3 receiving signal quality of the neighbor network node is smaller than the predetermined threshold.

20. The radio network node according to claim 19, wherein the processing circuit further performs following step:
selecting the small MSG3 size if the uplink sounding of the UE cannot be monitored.

* * * * *